United States Patent [19]
Krenn

[11] Patent Number: 5,351,434
[45] Date of Patent: Oct. 4, 1994

[54] BREAKAWAY JIG

[76] Inventor: Henry J. Krenn, 2545 Solano Rd., Unit F, Shell Beach, Calif. 93449

[21] Appl. No.: 155,840

[22] Filed: Nov. 23, 1993

[51] Int. Cl.⁵ ............................................. A01K 95/00
[52] U.S. Cl. ...................................................... 43/44.91
[58] Field of Search ..................... 43/44.9, 44.91, 42.36

[56] References Cited

U.S. PATENT DOCUMENTS

| | | | |
|---|---|---|---|
| 522,167 | 6/1894 | Rawlings | 43/44.9 |
| 755,683 | 3/1904 | Miller | 43/44.91 |
| 1,468,720 | 9/1923 | Low | 43/44.91 |
| 2,223,823 | 12/1940 | Hampton | 43/44.9 |
| 2,494,620 | 1/1950 | Johnson | 43/44.9 |
| 2,556,932 | 6/1951 | Morrissey | 43/44.91 |
| 2,958,153 | 11/1960 | Yerman | 43/44.91 |
| 3,020,670 | 2/1962 | Lockhart | 43/44.91 |
| 3,628,279 | 12/1971 | Halone | 43/44.9 |
| 4,615,136 | 10/1986 | Bank | 43/44.91 |

Primary Examiner—Kurt C. Rowan
Attorney, Agent, or Firm—Francis X. LoJacono

[57] ABSTRACT

A breakaway fishing jig adjustably mounted on a fishing line that extends through the fishing jig so as to define a lead line to which is attached a fishing hook, wherein the fishing jig is defined by an elongated metal body member formed with a central elongated bore, a front guide plug and a rear securing plug having passages axially aligned with the elongated bore, whereby the fishing line is threaded therethrough so as to extend rearwardly of the securing plug. A set screw is threadably mounted adjacent the rear of the body member, whereby the set screw forcibly engages the securing plug so as to fixedly engage the fishing line within the passage of the securing plug.

10 Claims, 1 Drawing Sheet

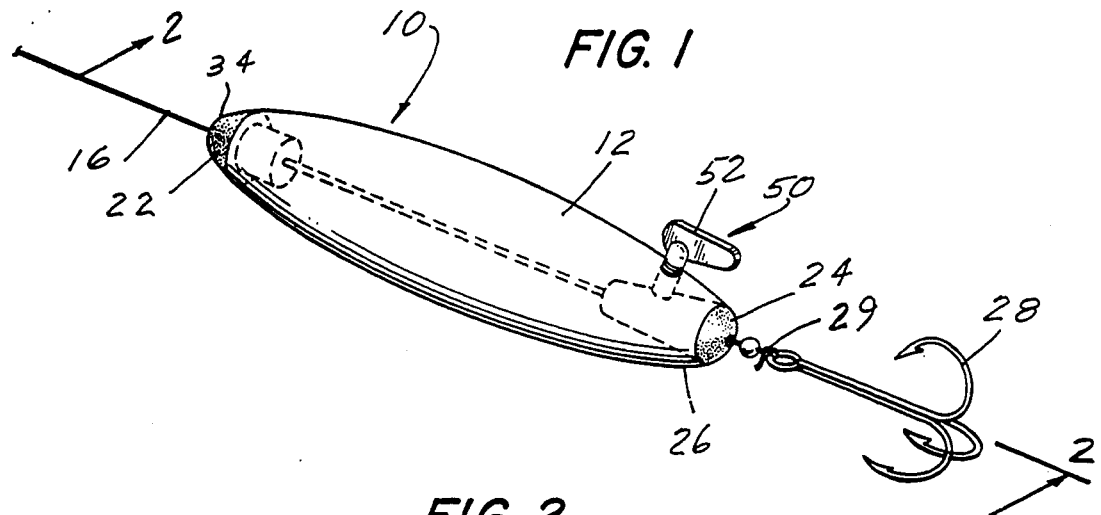
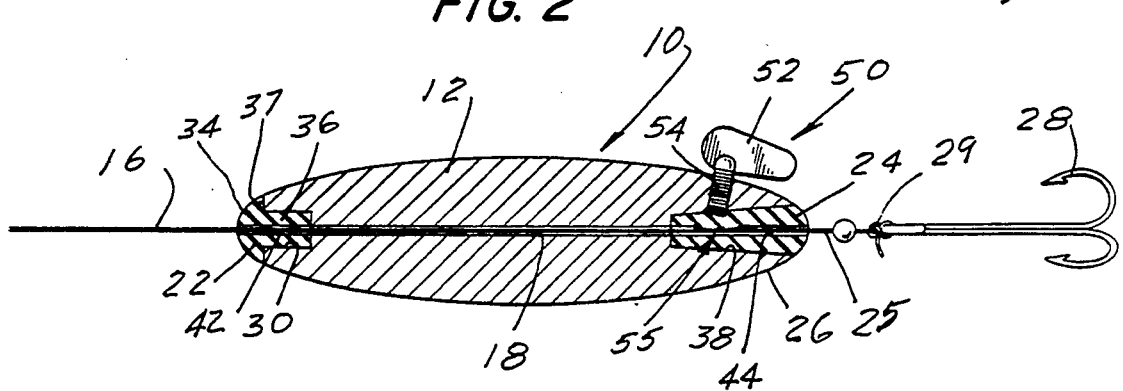
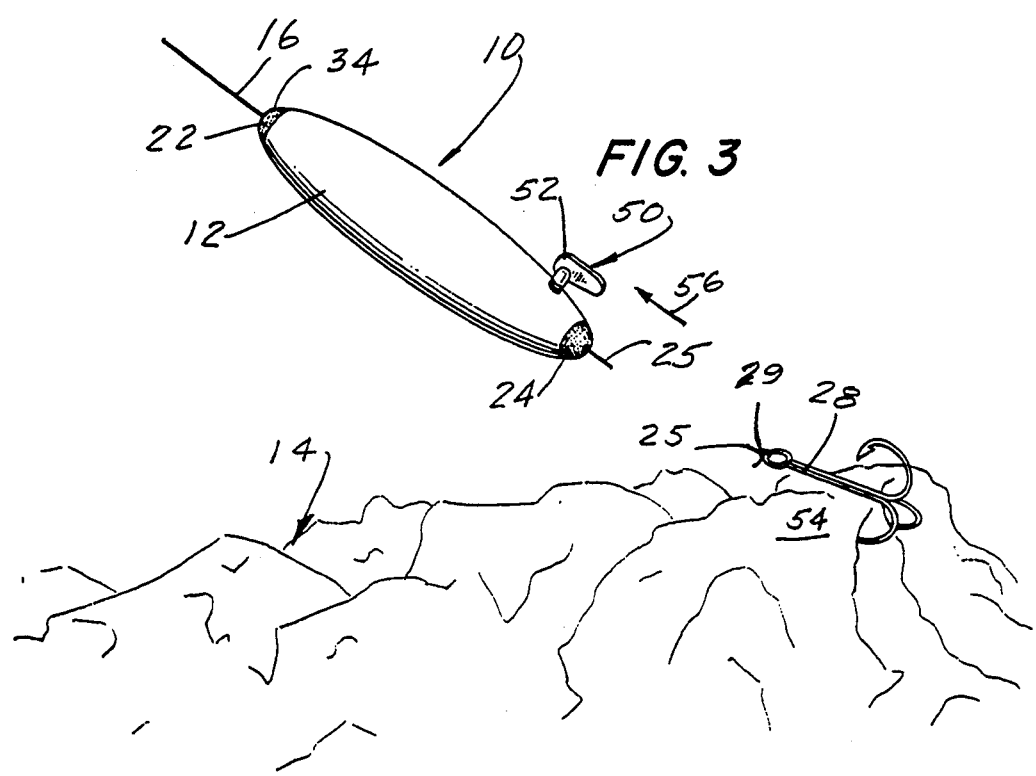

BREAKAWAY JIG

BACKGROUND OF THE INVENTION

1. Field of the Invention

This invention relates generally to a recoverable fishing jig and more particularly to a breakaway-jig device that is secured adjacent the terminating end of a fishing line to which a fishing hook is attached, whereby the breakaway jig can be separated from a stuck hook and retrieved with the fishing line.

2. Description of the Prior Art

As is well known in the art various problems and difficulties are encountered in providing suitable means for preventing a jig device from being lost when a trailing hook gets caught on rocks or hooked on an object submerged well below the waterline while fishing. Generally, a fishing jig is attached to the free end of a fishing line so as to attract fish and is followed by one or more hooks attached to the trailing end of the lure. When the hook is accidentally caught or snagged below the waterline, tension is applied to the line in attempt to free the hook together with the jig. However, when such a problem occurs both an inexpensive hook is lost along with a relatively expensive jig or lure.

Accordingly, many types of devices have been tried and suggested. However, these devices have various limitations and are often expensive in themselves or are complicated in their structure.

As examples of the prior art the following U.S. patents disclose various ways of trying to save a jig or lure when a hook associated therewith gets caught on an object well below the waterline. Various methods of separating the hook or hooks from a fishing line without losing the lure are disclosed. However, none of the patents discloses a jig having the features of the present invention.

U.S. Pat. No. 3,541,720 discloses a fishing spoon adapted to be attached to a line and a hook, wherein a replaceable jointless and continuous ring is positioned between the spoon and the hook. The ring has a uniform cross section and is controlled by a predetermined breaking resistance which is less than that of the fishing line. The ring will break when the hook is caught, allowing the fisherman to retrieve the spoon which is still attached to the fishing line.

In U.S. Pat. No. 4,125,958 there is disclosed a tension release coupling that is adapted to be connected between a fishing line and a fishhook or similar arrangement, wherein the hook can be detached from the fishing line when tension is placed on the line so as to free the line due to a hook being snagged on a submerged obstacle.

In U.S. Pat. No. 4,611,422 there is disclosed a fishing lure with a separable body and hook track having hooks mounted thereto. The hook track is slidably mounted in the body member of the lure. The body member is attached to the fishing line by a first slack leader line and the hook track is connected to the fishing line by a shorter leader line, whereby the shorter leader line will break first when the hook is snagged below the surface of the water. This allows the lure to be recovered as the body member of the lure separates from the stoke hook track which is attached to the snagged hook.

In U.S. Pat. No. 4,696,121 there is disclosed a breakaway clip which is arranged to fail at a predetermined tension level to allow the fishing line and lure to break away from a snagged hook.

SUMMARY AND OBJECTS OF THE INVENTION

The present invention relates to a saltwater jig that is of the type that is primarily used in bottom fishing and is generally defined as a heavy weighted object commonly made of solid lead to which a hook or hooks are attached. The problem that often occurs when using this type of jig is that the hook or hooks are attached to the rearward or trailing end of a fishing line which eventually becomes snagged on a submerged object such as a rock or other immovable debris. When snagging occurs an expensive jig is generally lost by extreme tension placed on the fishing line in an attempt to free the line. To overcome this problem the present invention discloses a breakaway jig having a forward recess in which a guide plug is mounted and a rear conical recess in which a line securing plug is mounted, both plugs being formed with a central bore that aligns with an elongated bore provided in the body of the jig. The fishing line is passed through the forward guide plug and through the central bore of the jig so as to extend through the pliable securing plug, whereby the fishing line extends rearwardly of the jig so that a suitable hook can be attached to the free end of the line. The fishing line is then secured within the rearward end of the jig by means of a thumb screw that is threaded into a threaded hole so as to engage the securing plug, thereby clamping the fishing line within the securing plug. A knot is tied in the line between the jig and the trailing hook at a point closest to the jig. If the trailing hook is snagged the lead line between the secured point in the jig and the hook will break at the knot which is the weakest point in the line, allowing the jig to be retrieved.

Accordingly, there is an important object of the present invention to provide a breakaway-jig device that includes a very simple fishing line securing means within a body of the jig device that allows the jig to be adjustably secured to the fishing line in such a manner as to cause the fishing line to break between the secured point at the rear of the jig and the hook attached to the trailing lead line portion of the fishing line.

Another object of the invention is to provide a breakaway jig that is adjustably secured to the fishing line so that only the snagged trailing hook is lost when the trailing lead line is subjected to strong pulling forces applied to the fishing line.

Still another object of the present invention is to provide a breakaway-jig device wherein the securing device within the jig body member prevents the jig from falling free of the broken unrestricted free end of the fishing line after the trailing lead line broken is under tension, leaving the snagged hook behind.

BRIEF DESCRIPTION OF THE DRAWINGS

These together with other objects and advantages which will become subsequently apparent reside in the details of construction and operation as more fully described and claimed hereinafter, references being had to the accompanying drawings forming a part hereof, wherein line numerals refer to like parts.

FIG. 1 is a perspective view of a breakaway jig secured to a fishing line having a trailing hook attached thereto;

FIG. 2 is a cross-sectional view taken substantially along line 2—2 of FIG. 1; and FIG. 3 is a pictorial view showing the lead line broken and the hook snagged on a rock with the jig of the present invention being retrieved with the remaining fishing line.

DESCRIPTION OF THE PREFERRED EMBODIMENT

A breakaway-fishing jig is illustrated in FIGS. 1 through 3 in accordance with the invention and is generally indicated by reference numeral 10. Breakaway jig 10 comprises a solid body member 12 that preferably has an elongated elliptical shape and is made of metal such as lead that will readily sink to the floor 14 of a body of water. Jig 10 is adapted to receive a fishing line 16 through the central axis of body member 12 which is defined by an elongated bore 18. The forward end 20 of jig 10 is provided with a forward or front mounted guide plug 22 and securing plug 24 mounted to the rear end 26 of body member 12. Accordingly, fishing line 16 extends rearwardly and outwardly from securing plug 24, defining a lead line portion 25 of the fishing line 16 which allows a suitable fishing hook, designated at 28, to be tied to the free trailing end thereof.

Breakaway jig 10 is formed with a counter sunk bore 30 that defines a forward recess in which a guide plug 22 is mounted. Guide plug 22 comprises a resilient body consisting of rubber or a suitable plastic that is formed with a rounded head member 34 and rear boss member 36 arranged to be fitted and securely received in the corresponding size bore 30. The diameter of head member 34 butts against the flat circular nose 37 of the forward end of the jig body member 12, as seen in FIG. 2. A rear bore defined by a conical recess 38 is formed in the rear portion of the body member 12 of the jig and is adapted to receive the line securing plug 24 mounted therein which is also conical in shape so as to fit tightly within rear conical recess 38. Both guide plug 22 and securing plug 24 are formed with a central passage 42 and 44, respectively, that align with the elongated bore 18 provided in the elongated body 12 of jig 10 along the horizontal axis thereof.

Fishing line 16 is passed through passage 42 of forward guide plug 22, through central horizontal bore 18 of jig body 12 and through passage 44 of the pliable securing plug 44. Fishing line 14 is extended rearwardly of the securing plug that defines a lead line 25 so that a suitable hook, such as tremble hook 28, can be attached to the free end of the lead line 25 in a suitable manner, as by tying a knot. The fishing line is then secured within the rearward end of the jig by a securing means, indicated generally at 50, which comprises a resilient securing plug 24 and a thumb screw 52 that is threaded into a forwardly inclined hole 54 adjacent the rear portion of jig body member 12.

The thumb screw 52 is positioned to engage the securing plug in a downwardly forward angle, thereby clamping the fishing line within the securing plug passage 44. This squeezing arrangement allows the screw engaging side of the plug 44 to forcibly engage line 16 and secure it in place within the jig and at the same time fixedly mount the securing plug to keep it from sliding out of the conical recess 38. If the trailing hook 28 is snagged on an object such as a rock, as illustrated at 54 in FIG. 3, lead line 25 will snap aft of the securing point 55 and in front of hook 28 when substantial tension is applied to fishing line 14. This allows breakaway jig 10 to be easily retrieved, as indicated by the direction of arrow 56, with stuck hook 28 being left behind, as illustrated in FIG. 3. The breakaway jig is firmly secured to fishing line 16 by means of thumb screw 52 and securing plug 24. When jig 10 is retrieved thumb screw 52 is loosened and fishing line 14 is again extended outwardly of the securing plug so that a new hook can be connected to the end of the line such as by knotting, as indicated by numeral 29.

The foregoing should only be considered as illustrative of the principles of the invention. Further, since numerous modifications and changes may readily occur to those skilled in the art, it is not desired to limit the invention to the exact construction and operation as shown and described, and accordingly, all suitable modifications and equivalents may be resorted to, falling within the scope of the invention.

What I claim is:

1. A breakaway jig device adjustably affixed to a fishing line, said breakaway jig device comprising:

an elongated body member having suitable weight, whereby the jig will sink to the bottom of a body of water, said body being formed with a front recess and a rear recess, and an elongated bore formed in said body member so as to communicate with said front recess and said rear recess;

a guide plug mounted in said front recess, said guide plug having a central passage formed therein to align with said elongated bore of said body member;

a securing plug mounted in said rear recess, said securing plug having a central passage formed therein to align with said elongated bore, wherein said passages of said guide plug and said securing plug are axially aligned with the center axis of said elongated bore in said body member, whereby the fishing line is received therethrough to extend outwardly and rearwardly of said body member; and wherein means for adjustably securing said fishing line comprises a set screw threadably mounted adjacent the rear of said body member, whereby said set screw forcibly engages said securing plug so as to fixedly engage the fishing line within the passage of said securing plug.

2. A breakaway jig device as recited in claim 1, wherein said rear recess is formed with a truncated configuration and wherein said securing plug is formed with a corresponding truncated configuration.

3. A breakaway jig device as recited in claim 2, wherein said set screw is positioned forwardly downward so as to engage said truncated securing plug, causing the engaging side to squeeze the fishing line threaded through the passage thereof, thereby fixedly securing said body member to the fishing line.

4. A breakaway jig device as recited in claim 3, wherein said securing means comprises a means for preventing said truncated securing plug from being moved rearwardly from said truncated recess when rearward tension is applied to the extended portion of the fishing line.

5. A breakaway jig device as recited in claim 4, wherein said guide plug is defined by a rounded head member having an extended boss member, wherein the boss member is formed to be fixedly received in said front recess of said body member.

6. The combination as recited in claim 4, wherein said guide plug is defined by a rounded head member having an extended boss member, and wherein the boss member is formed to be fixedly received in said front recess of said body member.

7. In combination, a fishing jig adjustably mounted on a fishing line which extends through the fishing jig so as to define a lead line to which is attached a fishing hook, said combination comprising:

a fishing jig having an elongated metal body member formed with a front recess and a rear recess, and an elongated bore formed in said body member so as to communicate with said front recess and said rear recess;

a guide plug mounted in said front recess, said guide plug having a central passage formed therein for axial alignment with said elongated bore of said body member;

a securing plug mounted in said rear recess, said securing plug having a central passage formed therein for axial alignment with said elongated bore, whereby said fishing line is passed therethrough so as to extend outwardly and rearwardly of said body member, defining a lead line;

a fishing hook attached to said fishing line; and means for adjustably securing said fishing line comprising a set screw threadably mounted adjacent the rear or said body member, whereby said set screw forcibly engages said securing plug so as to fixedly engage said fishing line within said passage of said securing plug.

8. The combination as recited in claim 7, wherein said rear recess is formed in a truncated configuration, and wherein said securing plug is formed in a corresponding truncated configuration.

9. The combination as recited in claim 8, wherein said set screw is positioned forwardly downward so as to engage said truncated securing plug, causing the engaging side thereof to squeeze the fishing line threaded through said passage, thereby fixedly securing said body member to said fishing line.

10. The combination as recited in claim 9, including means to prevent said truncated securing plug from moving rearwardly from said truncated recess when rearward tension is applied to the rearwardly extended portion of said lead line when said hook is snagged on an object below the surface of the water.

* * * * *